Figure 1:
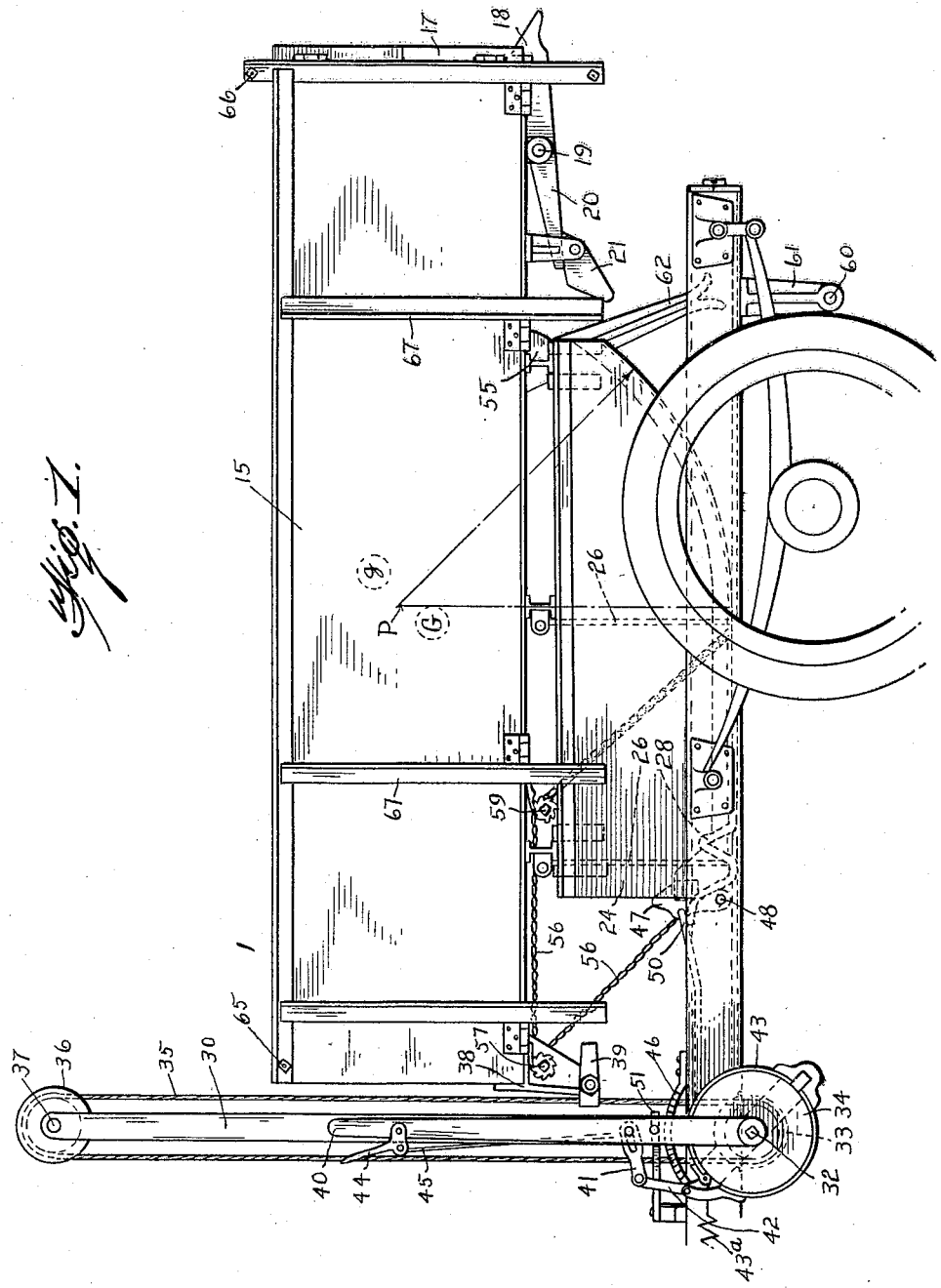

Jan. 26, 1932.  L. H. KING  1,842,986
DUMPING TRUCK
Original Filed Nov. 4, 1921  3 Sheets-Sheet 1

INVENTOR.
LANDRETH H. KING,
BY
Dorsey H Cole
ATTORNEYS

Jan. 26, 1932.  L. H. KING  1,842,986

DUMPING TRUCK

Original Filed Nov. 4, 1921   3 Sheets-Sheet 3

INVENTOR.
LANDRETH H. KING,
BY
Dorsey & Cole
ATTORNEYS

Patented Jan. 26, 1932

1,842,986

UNITED STATES PATENT OFFICE

LANDRETH H. KING, OF ORANGE, NEW JERSEY, ASSIGNOR TO KING MECHANISM AND ENGINEERING COMPANY, OF NEW YORK, N. Y., A CORPORATION OF NEW YORK

DUMPING TRUCK

Original application filed November 4, 1921, Serial No. 512,781. Divided and this application filed June 18, 1927. Serial No. 199,725.

This invention relates to vehicles organized for dumping preferably, although not necessarily to the rear. It is not material to the invention as to the motive power of the vehicle to which it is applied, as for example, animal driven or power driven; nor is it material as to the character of the road-way to which the vehicle is adapted, as for example, a rough farm road, a highway for rubber tired wheels, or a railway for flanged steel wheels.

My present application is a division of my application, Serial No. 512,781, which issued into Patent No. 1,639,092, and reference is made thereto for more particular and full disclosure of the features of the mechanism, not particularly associated with the subject-matter of this present application, such present application being directed to one of the objects set out in my said parent patent, namely, to provide for the conversion from a box body to a platform body, and for utilizing the sides of the box body as side extensions of the platform, and to the features of the invention associated therewith.

In the accompanying drawings, illustration has been made of only so much of the mechanism not germane to the conversion feature from box body to platform body, and features associated therewith, as will give a general idea of the construction and operation of the vehicle as a whole, reference being made to the said parent patent for a more full and complete disclosure thereof.

In the drawings in which a truck is chosen as an illustrative example of the invention,—

Figure 1 (which corresponds to Figure 1 of my parent patent) is a side elevation of a dumping truck which embodies this invention, and illustrates the same in the upper loading position, the forward portion with a chauffeur's seat, and the power plant being omitted.

Figure 2:
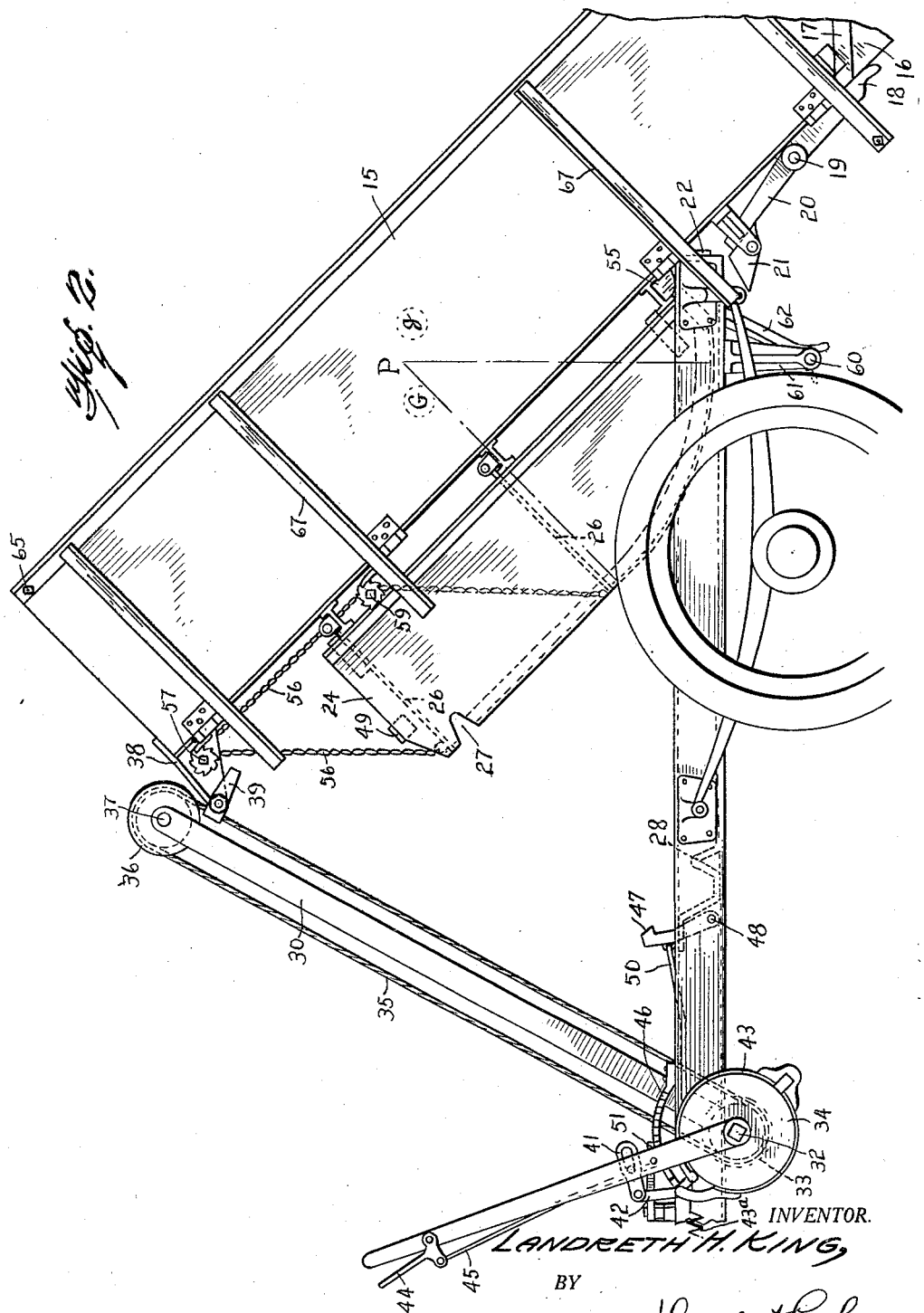

Figure 2 (which corresponds to Figure 2 of said parent patent) is a side elevation showing the same in dumping position.

Figure 3:
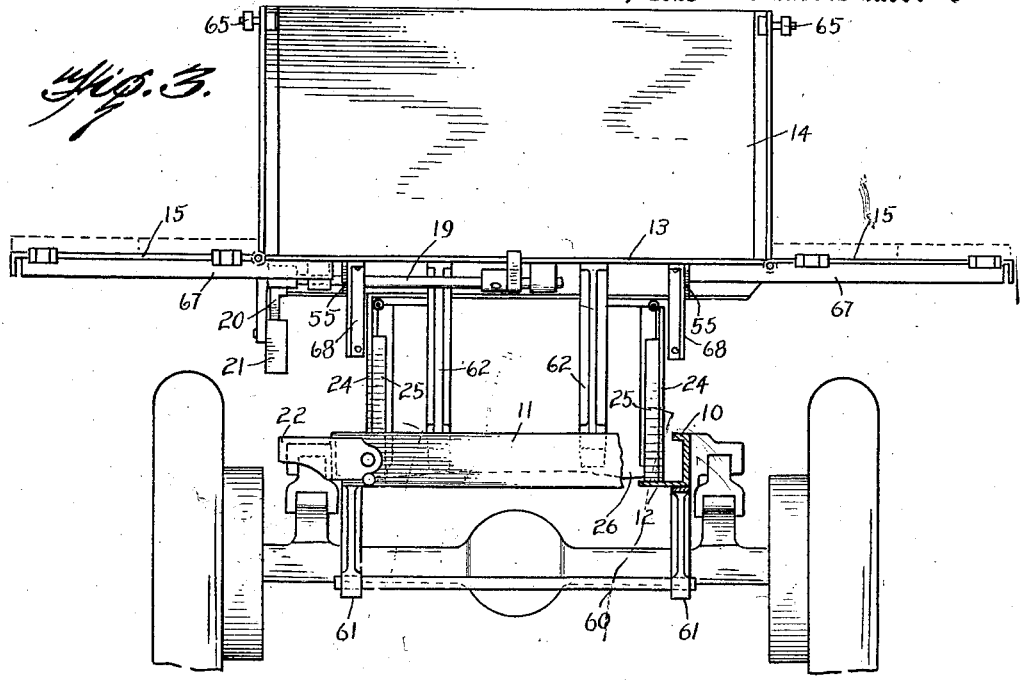

Figure 3 (which corresponds to Figure 7 of said parent patent) is a rear elevation showing the body converted to platform form, the cable frame not being shown.

Figure 4:
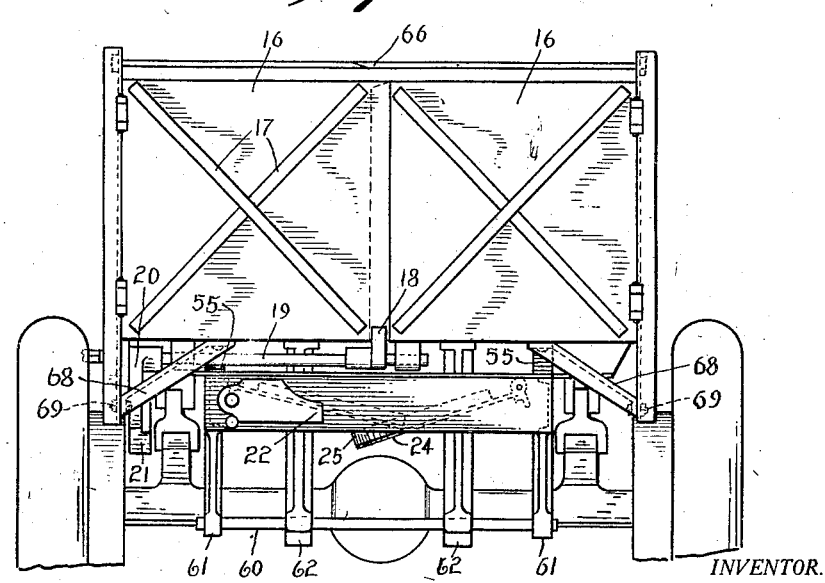

Figure 4 (which corresponds to Figure 8 of said parent patent) is a rear elevation showing the body in lowered position and the rockers folded.

Referring now to the particular construction chosen for illustration, advantage is taken of the parallel inwardly faced channel members 10, and rear connecting member 11 present in an automobile truck frame of usual form. Trackways 12 (see Fig. 3) extending from the lower flanges of the side members support a body consisting of a floor 13, a front plate 14, and side plates 15. The rear of the body comprises two doors 16 hinged to the side plates and over-lapping at the middle. These are suitably braced by diagonal cross braces 17 so that they may be secured by a single rearwardly extending latch 18 at the over-lapping portions.

This latch, normally maintained in latching position by gravity, is rigidly mounted on a shaft 19, and is moved to unlatching position by a forwardly extending lever 20 located at the side of the body and also rigidly mounted on the said shaft. The forward end of the lever engages a cam 21 pivoted to the side of the car body, which cam strikes a projection 22 from the truck frame to trip the latch while the body is being tilted, thus permitting the doors to open. It will be observed that in completed dumping position, the cam is below and clears the projection; see Fig. 2. The projection is shown as being pivotally connected with the rear bar of the truck frame so that it may be turned to the position shown in Fig. 4 when not in use if desired.

Depending from the body are rockers consisting of plates 24, reinforced on the lower edges with curved angle irons 25. The rockers are hinged to the floor of the body and are capable of being folded toward each other, but are normally held parallel by one or more braces 26 between the rockers of any suitable type, being illustrated in the form of transverse plates. The rear portions of the rockers are curved with a point P as the center of curvature which is located above and preferably to the rear of the center of gravity G of the rockers and body when not loaded, and also preferably low enough to be below and forward of the center of the gravity $g$ of the rockers and body together with its load. The rockers follow the circle only to the rear of a vertical line from the center P, and forward of this line are parallel with the floor of the body. The trackways 12 for the rockers are located on as low a line as possible so that the radius of curvature of the rockers may be long without unduly elevating the body and keeping the location of the centers as above defined. In consequence not only is gravity dumping and return provided for but in dumping the body will be carried rearwardly and will discharge its contents at a considerable distance from the truck. The rockers are provided each with a notch 27 for engagement with a corresponding corrugation 28 in each of the trackways to prevent forward and rear sliding of the rockers and body on the trackways. The system of relatively curved rockers and trackways set out above, which effect a gravity dump and return of the body, embodies one form of means whereby the dumping body is caused to move from one position to another.

The trackways comprise strips of sheet metal riveted to the lower flanges of the side members and extending along the side members for such distance as is required for the rockers. At the forward ends the trackways are bent upward to brace and strengthen them and to cooperate with the corrugations just mentioned in preventing forward displacement of the body and rockers, but these portions are narrowed sufficiently to clear the braces when the latter are folded upward as will later be explained.

Mounted on the truck frame at the front of the body is a cable carrier comprising one or more uprights 30. These are pivotally carried on the truck frame by hangers (see Fig. 5 of said parent patent) which support a shaft 32 upon which the uprights are rotatably mounted. This shaft has rigidly attached thereon cable-drums 33 and a brake-drum 34. The ends of the shaft project beyond the hangers and are squared so that a crank can be applied thereto for manual operation. Cables 35, the ends of which are attached to their respective drums, lead over sheaves 36 rotatably mounted on a shaft 37 which connects the upper ends of the uprights. Brackets 38 are attached to the forward corners of the body and clamps 39 pivoted thereto engage the cables. The cable system, set out above, through which a manual operation of the body may be effected, embodies another form of means whereby the dumping body is caused to move from one position to another.

A brake-lever 40 through a slack motion link 41, and a lever 42 spring biased as at 43ª in brake applying position, expands and closes a brake-strap 43 which surrounds the brake-drum. The brake-lever has a latch handle 44 from which a rod 45 leads to an arc 46 with notches which are engaged thereby to hold the lever in any operated position. Normally the brake-lever is locked positively to maintain the brake-strap in tight engagement upon the brake-drum so as to prevent tilting of the body. It is the arrangement above described which comprises what is referred to in the statement of objects of the invention, in said parent patent, as the regulating means.

The means for securing the body in its load carrying position which it will be observed cooperate with the regulating means comprise positive latches 47 spring biased (see Fig. 9 of said parent patent) in locking position. These are rigidly mounted on a rod 48 supported between the side members of the truck frame and engage lugs 49 on the inner sides of the rockers. A rod 50 from one of the latches connects with a bell-crank 51 (better illustrated in Fig. 9 of said parent patent), one branch of which has a cam face. This is engaged by the side of the brake-lever during the first part of its forward travel to release the brake and retracts the latches moving the same forwardly sufficiently for all clearance purposes. The first part of the forward travel of the brake-lever, however, does not release the brake by reason of lost motion provided in the link 41 between the brake-lever and the brake mechanism, so that the latches are withdrawn and the brake released at successive positions of the brake-lever.

As more particularly set forth in said parent patent, the invention provides for the conversion of a truck embodying the same from a dumping truck to a non-dumping truck. This feature of convertibility is broadly effected by folding the rockers beneath the body and lowering the body from its load carrying position as a dumping truck to a load carrying position directly supported upon the truck frame itself. In this connection compare for example, Figures 1 and 3 of said parent patent. It is obvious, however, that with the rockers folded and the body in its lower load-carrying position manual dumping is still possible by means of the cable mechanism above described.

When the body is in its extreme dumping position curved blocks 55, under the floor of the body bear at the rear ends of the truck frame, and if the forward end of the body is raised slightly above its dumping position by manually turning the shaft 32 of the cable frame, the rockers will be lifted clear of the trackways so that they may be folded up toward the floor of the body. While this folding may be done manually without departing from my invention, I have illustrated power means for effecting this. Chains 56 lead from the braces between the rockers to a shaft 57, the rear of these leading over a loose sheave on a shaft 59. One end of the shaft 57 is squared so that a crank may be applied for turning the shaft and winding the chains thereon to fold the braces from between the rockers. The braces are cut away above their lower portions to permit of easy folding and as to the forward brace to clear the locking lugs 49. When the braces are folded the rockers can be folded. Chains (illustrated in Figures 4 and 6 of said parent patent) attached to the rockers lead to the shaft 59 which is also squared for the application of a crank to wind these chains thereon. One of the chains is longer than the other so that the rockers will not start to fold at the same time and will not collide in folding and will overlap when folded. Each shaft is provided with a ratchet and pawl for holding the braces and rockers respectively in their folded positions. When the rockers are folded out of the way the body can be lowered by the cables to the position shown in Figure 4, and there locked by means of the brake mechanism above described. If desired the braces may be folded before the body is raised to dumping position. Obviously the invention is not limited to the use of a plurality of chains for folding.

It is desirable that in this lower load carrying position the body should be forward of the position to which it would naturally lower if turned on the curved blocks 55 about the rear end of the truck frame as an axis. If it is desired to effect this automatically there may be provided a transverse rod 60 carried by brackets 61 depending from the truck frame, and forked arms 62 depending from the floor of the body for engagement therewith when the body is in dumping position. These continue in engagement so that the rod becomes the axis of movement when the body is turned to its non-dumping position with the rockers folded or returned therefrom. These members also prevent accidental sliding of the body backward or forward on the chassis. While the lowering is effected by gravity it is to be regulated manually from the shaft 32 through the cable mechanism as will be readily understood. In reconverting to an automatic dumping truck the body is raised to dumping position by means of the cables and the rockers and their braces allowed to unfold under control of their folding mechanism.

The feature of convertibility to which this present application is particularly directed, relates to the conversion of the truck from a box body to a platform body. It will be observed in the specific example of the invention shown when the body is in its lower load carrying position, Fig. 4, the lower portion of the body lies between the truck wheels. This is a common type of truck especially of low tonnage. With such a truck this feature of convertibility is impossible without first raising the body to a supported position above the truck wheels. For this purpose certain other features of my invention afford convenient means. With trucks, however, in which the normal body supports are high and the body projects above and beyond the truck wheels, the convertibility feature now under consideration is applicable to the lower load carrying position of the body and where certain other features of my invention are present also to the upper load carrying position of the body.

To effect the conversion from box body to platform body in the specific example shown the side plates of the body are hinged to the floor and are secured to the front plate by removable bolts 65 and at the rear preferably by a removable tie-rod 66. As this tie-rod may interfere with the discharge of the load in dumping when the material handled is of a character which can not be depended upon to flow freely under it, alternative or auxiliary means are provided. To cooperate with the hinges when the side plates are unfolded to platform position vertical ribs 67 are provided. These extend below the edges of the side plates when the latter are in box body position and the rear pair of them may be conveniently employed for the purpose now in hand. To this end there are provided diagonal braces 68 pivoted to the floor of the body in line with the said braces which can be moved for engagement therewith and secured thereto by bolts 69. A substantial brace is thus afforded to hold the side plates in their box body position. These braces can be unbolted from the vertical ribs and readily turned out of the way for unfolding the side plates to platform position. It is thought that the operation of converting from box body to platform body and vice versa will be readily understood without further explanation. The braces are specifically shown in Fig. 4. The manner in which the vertical ribs cooperate with the hinges when the side plates are lowered is illustrated in Figure 3 wherein they are shown as folding against the under side of the body floor. When the side plates are thus folded down the doors may be detached at their hinges or may be folded over on the side plates as shown in dotted lines in Figure 3.

From a consideration of Figures 2 and 4 it will be seen that the sides of the body may be moved from an outward position toward the upright position on returning the body from a dumping position to a load-carrying position, because should the sides be in extended position when the body is in the position of Figure 2, by folding the rockers in and lowering the body the wheels in contacting with the sides as the body assumes a loading position will raise the sides toward their upward position.

The foregoing detailed description has been given for clearness of understanding and no undue limitation should be deduced therefrom, but the appended claims should be construed as broadly as permissible in view of the prior art.

What I claim as new and desire to secure by Letters Patent is:—

1. In a dumping vehicle the combination of a frame and a truck body having sides hinged to the floor and capable of being folded down so as to become side extensions of the floor when the truck body is in a bodily raised position with reference to the frame, means carried by the floor for securing the sides in vertical position when the body is in lowered position with reference to the frame, means for supporting the sides as side extensions of the floor when the body is in bodily raised position with reference to the frame and means whereby the body may be supported in bodily raised position with respect to the frame whereby the sides may be folded down as side extensions of the floor.

2. The combination in a dumping vehicle of a frame, a dumping body adapted to occupy a raised position and a lowered position with reference to the frame, said body comprising a floor, side members hinged thereto, and an outwardly opening door, rockers on which the body may turn in assuming dumping position, said rockers being movable to a position to allow the body to be moved to said lowered position and being also movable to a position to support the body in said raised position, means for supporting the side members in vertical position when the body is in said lowered position or in the plane of the floor as side extensions thereof when the body is in said raised position, and means for locking the door closed in load-carrying position when the said members are in vertical position and for releasing it as the body assumes dumping position.

3. The combination in a dumping vehicle of a frame, a dumping body adapted to occupy a raised position and a lowered position with reference to the frame, comprising a floor, side members hinged thereto, rockers on which the body may turn in assuming dumping position, said rockers movable to position to allow the body to be moved to said lowered position, and being also movable to position to support the body in said raised position, and means for supporting the side members in vertical position when the body is in said lowered position or in the plane of the floor as side extensions thereof when the body is in said raised position.

4. In a dumping vehicle having wheels, a body adapted to occupy a lowered position between the wheels and a raised position above the wheels, said body having extensible sides, means for supporting the body in raised position, said means adapted to be moved to position to allow the body to occupy said lowered position, means for supporting the said sides in raised position when the body is in lowered position and as side extensions of the floor of the body when the body is in raised position.

5. In a dumping vehicle having wheels, a body adapted to occupy a lowered position between the wheels and a raised position above the wheels, said body having extensible sides, means for supporting the sides in extended position as extensions of the floor of the body when the body is in raised position, said wheels adapted to engage the sides to move them towards vertical position as the body is moved from a raised position above the wheels to a lowered position between the same.

6. In a dumping vehicle, the combination of a body having outwardly folding sides, a frame upon which the body is mounted, a pivotal connection between the body and the frame normally disengaged, means for effecting dumping of the body around the pivotal connection and means whereby the folding sides of the body may be moved from their outward position toward their upward position on returning the body from a dumping position to a load-carrying position.

7. The combination in a convertible vehicle of a frame, a body adapted to occupy a raised and a lowered position with respect to the frame, said body comprising a floor and side members, with hinges connecting the same, ribs attached to the side members and braces attached to the floor, said ribs and braces being relatively movable for co-engagement, said ribs cooperating with said braces when in engagement therewith to maintain the side members in vertical position in box arrangement with the floor when the body is in lowered position, and said ribs co-operating with the hinges to maintain the side members in platform arrangement with the floor as side extensions thereof when the body is in raised position, and means whereby the body may be supported in raised position.

In testimony whereof I hereunto affix my signature.

LANDRETH H. KING.